Dec. 27, 1955  A. E. DRISSNER  2,728,414
MACHINE SPINDLE LUBRICATION
Filed Nov. 3, 1953  3 Sheets-Sheet 1

INVENTOR.
ALFRED E. DRISSNER
BY
Woodling and Krost,
Attys.

Dec. 27, 1955  A. E. DRISSNER  2,728,414
MACHINE SPINDLE LUBRICATION
Filed Nov. 3, 1953  3 Sheets-Sheet 2

INVENTOR.
ALFRED E. DRISSNER
BY Woodling and Krost,
attys.

Dec. 27, 1955  A. E. DRISSNER  2,728,414
MACHINE SPINDLE LUBRICATION
Filed Nov. 3, 1953  3 Sheets-Sheet 3

INVENTOR.
ALFRED E. DRISSNER
BY
Woodling and Knost,
attys.

United States Patent Office 2,728,414
Patented Dec. 27, 1955

2,728,414

MACHINE SPINDLE LUBRICATION

Alfred E. Drissner, Cleveland, Ohio, assignor to The National Acme Company, a corporation of Ohio Application November 3, 1953, Serial No. 389,943

14 Claims. (Cl. 184—6)

The invention relates in general to a lubrication mechanism for a machine tool spindle and more particularly to the means for lubricating the individual plural spindles in a rotatable spindle carrier in a machine tool.

Multiple spindle automatic machine tools are those wherein a plurality of spindles, such as 4, 6, or 8, are journaled for rotation in a spindle carrier which in turn is indexably rotatable to positions equal in number to the number of spindles. The machine tool has generally a plurality of tool slides each of which may carry tools for operation on workpieces carried in the plurality of spindles. The spindle carrier may be indexed from position to position so that the plurality of tools may successively perform work operations on the workpieces. In such machine tools it has been customary to provide lubricating oil for the gears, bearings, and cams and also to provide a cutting oil for the machining operations. The lubricating oil and cutting oil must be kept separated and provided with separate circulation systems. Also, the machine tool must be provided with rotating liquid seals to separate the lubricating and cutting oils.

For several years the oil companies have been suggesting the use of an all-purpose oil which acts both as a lubricant and as a cutting oil so that the machine tool user need not bother about intermingling of the two oils. The cutting oil generally contains free sulphur or the like for good cutting properties, and this free sulphur is damaging to the carefully machined parts of the machine tool when such oil is used also as a lubricant. In some machine tool constructions the rotatable spindle carrier is journalled in sleeve bearings with the plurality of rotatable spindles journalled therein on parallel but not coaxial axes. Lubricant passageways had been provided through the spindle carrier and into the bearings of each spindle. This was the prior art construction; and when a bearing for a spindle would fail as a result or as aggravated by the cutting oil used as a lubricant, the metal particles from the failed bearing would pass through the oil hole to the mating surfaces defining the sleeve bearing between the spindle carrier and the frame of the machine tool. This spindle carrier might be in the order of eighteen to thirty inches in diameter, and the metal particles would score this sleeve bearing to the point where it would have to be rebored and rebushed in order to again place the machine tool in serviceable condition. Also, the metal particles would get into another oil hole and ruin the bearings in other spindles thus making a very expensive overhaul by several bearings failing rather than only one.

An object of the invention is to provide separate bearings having no intercommunicating passageways to prevent the failure of one bearing affecting another bearing.

Another object of the invention is to provide a continuous unbroken peripheral wall between separate bearing means so that metal particles and other contamination which may appear in one bearing are prevented from passing to a second bearing means.

Another object of the invention is to provide a form of oil pump which will deliver lubricant to a bearing along a line generally parallel to the axis of the bearing.

Another object of the invention is to provide a form of lubricant pump for a bearing and having relatively rotatable parts with grooves in one of the parts and a fairly big clearance between the rotatable parts to prevent building up any appreciable pressure after the bearing is full of lubricant.

Another object of the invention is to provide an oiling system for a spindle of a machine tool wherein the spindle carries a rotatable oil sleeve having spiral grooves thereon and with the sleeve loosely fitted within a bore in the spindle and with oil fed to one end of the sleeve grooves to be passed by these sleeve grooves as they are rotated to a bearing journalling the spindle.

Other objects and a fuller understanding of this invention may be had by referring to the following description and claims, taken in conjunction with the accompanying drawings, in which:

Figure 1:
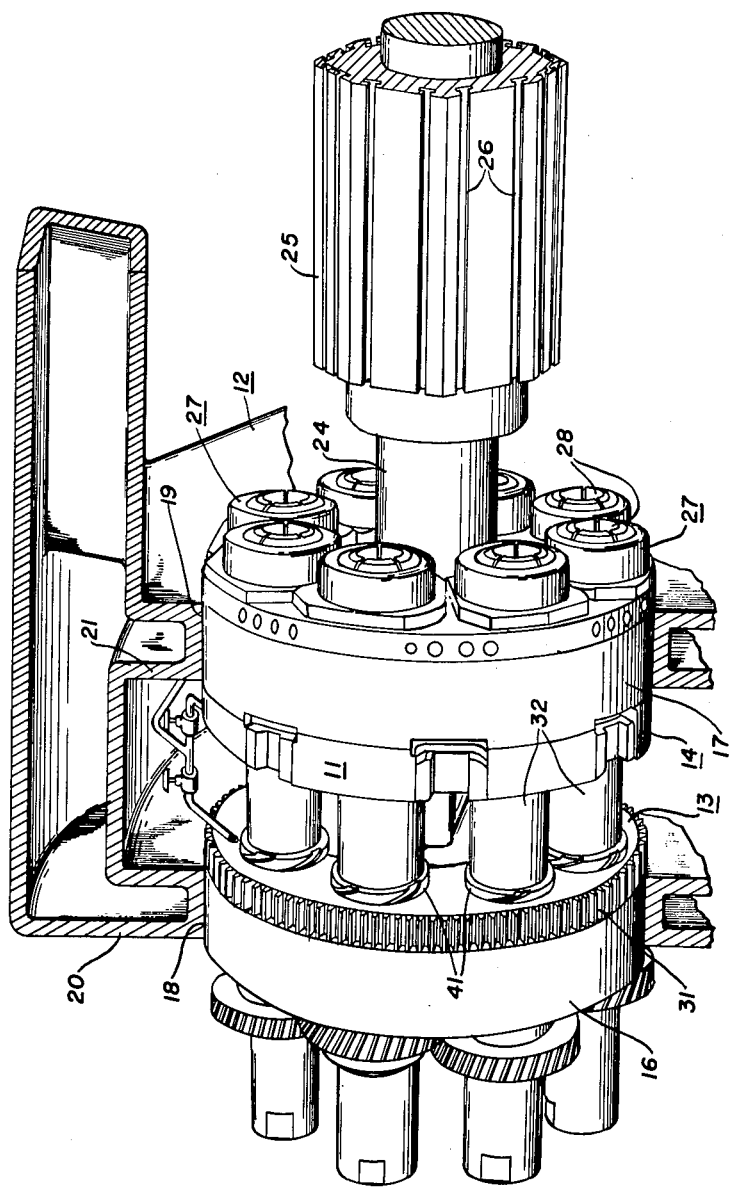
Figure 1 is a perspective view of a spindle carrier journalled in a cutaway frame.

The Figure 1 shows one form of a spindle carrier 11 for an automatic machine tool having a frame 12. The spindle carrier 11 is representative of many forms of spindle carrier usable in machine tools and, as shown, has a first portion 13 and a second portion 14 having first and second cylindrical bearing surfaces 16 and 17, respectively. The bearing surface 16 is journalled in a bearing surface 18 in a portion 20 of the frame. Similarly, the bearing surface 17 is journalled in a bearing surface 19 in a portion 21 of the frame.

The spindle carrier 11 also has integral therewith a central shaft 24 on which is slidably mounted an end tool slide 25. This end tool slide has mounting grooves 26 for fastening tool attachments, not shown, for carrying tools for operating on a plurality of workpieces, not shown. A plurality of spindles 27 are each journalled in the portions 13 and 14. The spindles carry chucks 28 to grip individual workpieces, such as bar stock, as is conventional practice.

Figure 2:
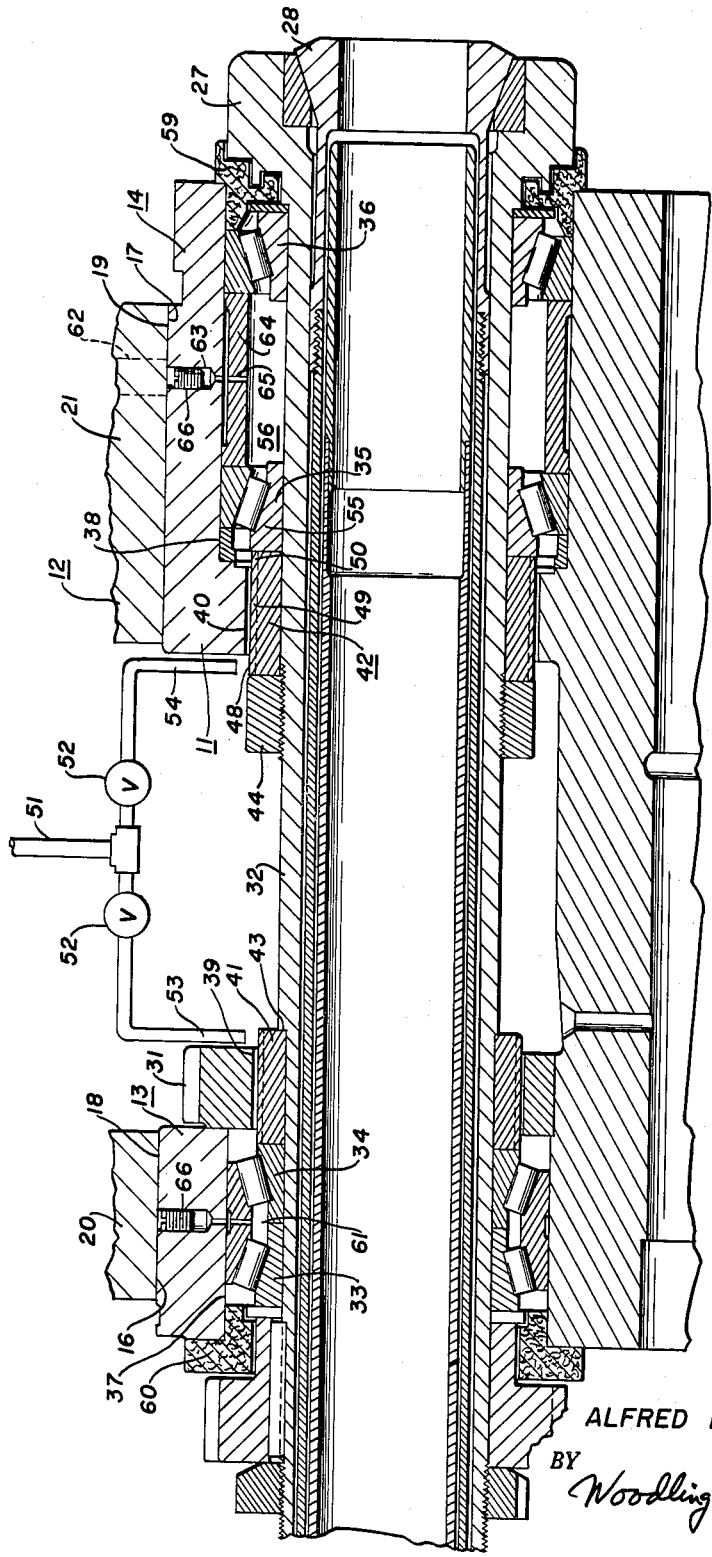
Figure 2 is a longitudinal sectional view of one of the spindles and a part of the spindle carrier.

The Figure 2 shows a longitudinal section through one of the spindles 27 and a part of the spindle carrier 11. The two portions 13 and 14 of the spindle carrier 11 are shown. A sleeve bearing is provided at 16—18 and a second sleeve bearing is provided at 17—19. These two sleeve bearings journal the spindle carrier 11 relative to the frame 12. An indexing gear 31 is fastened to the spindle carrier 11 for rotatably indexing this spindle carrier to various positions which would be eight in number as illustrated by this eight-spindle spindle carrier. It is obvious, however, that any number of spindles may be used. The spindle 27 has a tubular portion 32 on which are mounted the inner races of four tapered roller bearings 33, 34, 35, and 36. The outer races of the roller bearings 33 and 34 are carried in a bore 37 in the spindle carrier portion 13. The outer races of the roller bearings 35 and 36 are carried in a bore 38 in the spindle carrier portion 14. The indexing gear 31 has a bore 39 which is contiguous and coaxial with the bore 37 but of smaller diameter. Also, a bore 40 is provided in the spindle carrier portion 14 contiguous and coaxial with the bore 38.

Figure 3:
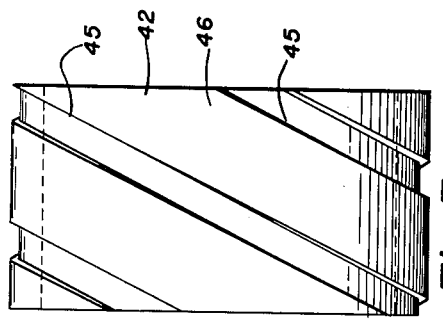
Figure 3 is a side elevational view of a lubricant sleeve.
Figure 4:
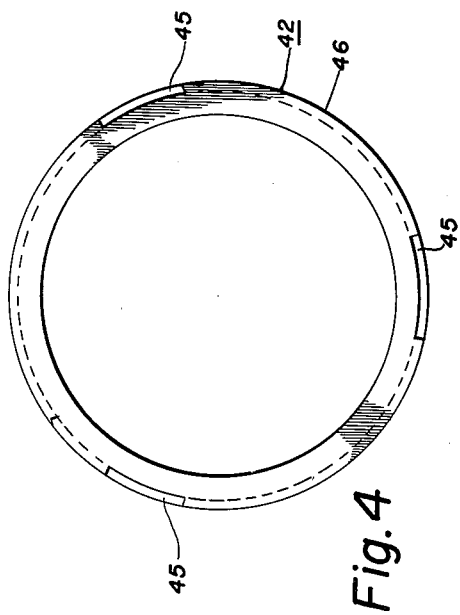
Figure 4 is an end view of the sleeve.
Figure 5:
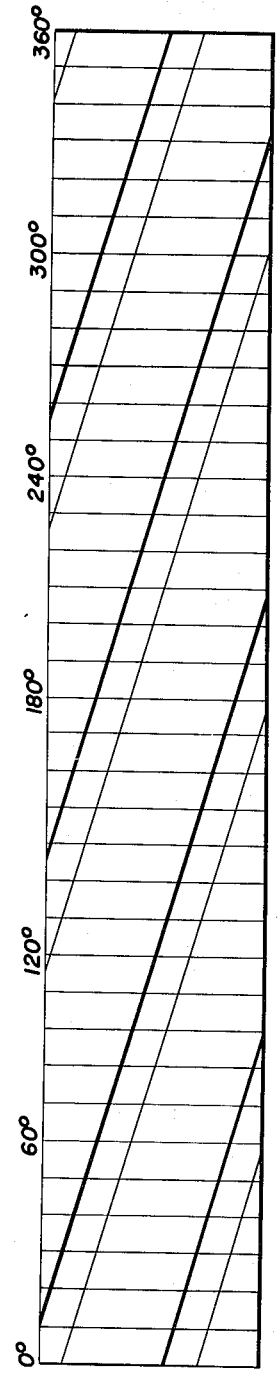
Figure 5 is a developed view of the sleeve.

First and second oil sleeves 41 and 42 are fastened to rotate with the tubular portion 32. The first oil sleeve 41 abuts a shoulder 43 on the tubular portion 32, and the second oil sleeve 42 abuts a nut 44 threaded on the tubular portion 32. The shoulder 43 and nut 44 are design choices and either one or a combination of both may be used in the construction of this lubricating mechanism. The sleeve 42 is better illustrated in Figures 3, 4, and 5 wherein it will be seen that a plurality of grooves 45 are provided, separated by lands 46. The grooves 45 are generally spiral, and in this case three grooves have been provided. In the actual case with the oil sleeve of approximately six inches diameter, the grooves may be about one-half inch wide and one-twelfth to one-eighth inch deep.

Referring to Figure 2, the sleeve 42, for example, has a first end 48, a mid portion 49, and a second end 50. The lands of the mid portion 49 have a relatively large clearance with respect to the bore 40, and this clearance may be in the order of .015 to .105 of an inch depending upon the viscosity of the oil to be used and the average peripheral speed of the oil sleeve 42. An oil supply conduit 51 has been diagrammatically illustrated with valves 52 controlling the supply of lubricant to tubes 53 and 54. The tube 54 cooperates with the first end 48 of the sleeve 42 and supplies oil, preferably in a small continuous stream thereto. The left-hand spiral grooves 45 will act as a form of pump since they cooperate with the smooth bore 40. Oil will thus be supplied from the first end 48 to the second end 50 and hence to the roller bearings 35 and 36. It has been found preferable to make the diameter of the oil sleeve 42 the same as or greater than the diameter of the inner race 55 of the roller bearing 35 in order that oil may be readily supplied to the bearings 35 and 36. A clearance of about one-thirty-second of an inch between the lands 46 and the bore 40 has been found satisfactory to completely fill with oil the chamber 56 between the bearings 35 and 36 without building up excessive oil pressure. It is merely desired to supply adequate lubrication to the bearings 35 and 36 and to insure adequate bearing life. Excessive pressures should not be built up through action of the oil sleeve 42.

An oil seal 59 is provided at the front of the spindle 27 to separate the lubricating oil and cutting oil and to make certain that the chamber 56 is maintained full of lubricant. The oil sleeve 41 acts in a similar manner and oil delivered by the tube 53 is passed with a pumping action to the bearings 33 and 34. An oil seal 60 is provided at the rear of the spindle 27 to maintain full of oil the chamber 61 between the bearings 33 and 34.

The previous method of lubricating the spindles 27 was to have some form of passageway 62, indicated by dotted lines, in the frame 12. This passageway 62 would communicate with an oil hole 63 in the spindle carrier 11. The spacer sleeve 64 between the bearings 35 and 36 was also provided with an oil hole 65. Thus, for each indexable position of the spindle carrier 11, the lubricant supplied continuously to the passageway 62 would be passed through the oil holes 63 and 65 to that particular spindle in the topmost index position. This was a satisfactory lubricating method which had been used for many years. When some of the oil companies began advocating all-purpose lubricating and cutting oils, however, it was found that bearings would fail and that these failed bearings had excessive deposits of foreign substances containing relatively large amounts of sulphur. When the bearing would fail, the metal particles from the failed bearing would pass outwardly through the oil holes 65 and 63 and thus lodge between the bearing surfaces 17 and 19. They would thus score both of these bearing surfaces, necessitating a reboring, refinishing, and rebushing job to again place the machine in operation. Thus, instead of having only one roller bearing of say six inches in diameter failing, one would also have a large sleeve bearing of thirty inches in diameter also failing. Further, the metal particles could find their way into oil holes 63 and 65 of other spindles to cause those roller bearings therein also to fail. Still further, as the spindle carrier 11 is indexed, the spindles 27 successively take turns being at the bottom of the spindle carrier, and in the prior art construction the oil in the chamber 56 could thus run out the oil holes 65 and 63, rather than being retained in this chamber as in the present construction. The present method, therefore, eliminates the need of the oil holes 62, 63, and 65; and hence, plugs 66 have been shown as inserted in these oil holes. This eliminates any communication between the sleeve bearings 17–19 and the roller bearings 35 and 36 and prevents the failure of one of the bearings from affecting the other of the bearings. The use of the plugs 66 will permit conversion of old machines into the new system of lubrication by the addition of the oil sleeves 41 and 42; however, obviously in new machines being constructed the oil holes 62, 63, and 65 would not even be drilled, thus leaving a continuous unbroken wall between the bearing means which journals the spindle carrier 11 and the bearing means which journals the spindles 27. The rotatable spindle 27 in the indexable spindle carrier 11 is an example of two machine parts journalled on parallel but not concentric axes with one part inside the other and with no communication between the bearings for each part, and further with lubrication to the inner part being supplied along a line generally parallel with the axis thereof.

The Figure 2 further shows that bearing means 33—34 and second bearing means 35—36 may be axially spaced and lubricated from right- and left-hand spiral grooves on the rotatable unit coaxial with these bearing means. Many rotatable machine parts have axially spaced bearings with a lubricant reservoir or other lubricating supply means between the two bearings. The oil sleeve 42 has left-hand spiral threads and the oil sleeve 41 has right-hand spiral threads. This means that with counter-clockwise rotation of the spindle 27, as viewed from the front of the spindle, oil from the supply conduit 51 will be forced axially outwardly by the spiral grooves to reach both the bearing means. The spiral grooves provide a lubricant path which is parallel to the axis of the spindle 27, that is, it is a longitudinal path. Since the sleeves 41 and 42 are fastened to the spindle 27, the grooves may be considered as being in a part of the complete spindle. Further, the spindle 27 becomes a movable unit which has grooves in a peripheral surface such that movement of the unit is at an acute angle to the grooves thereby forcing lubricant through the grooves from one end to the other thereof to lubricate the bearing means.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A lubrication system for a machine having a frame, first bearing means in said frame, a movable carrier journalled in said first bearing means on a first axis, a bore in said carrier having first and second contiguous portions, said first portion being defined by first peripheral surface means, second bearing means in said second portion, a movable unit journalled in said second bearing means on an axis non-coincident with said first axis, said unit having second peripheral surface means cooperating with said first peripheral surface means, grooves on one of said first and second peripheral surface means, said grooves extending to said second bearing means and lubricant means cooperating with said grooves to introduce lubricant thereto, said grooves being so disposed that relative movement of said first and second peripheral surface means is at an acute angle to said grooves thereby forcing lubricant through said grooves to lubricate said second bearing means, said carrier providing a continuous unbroken peripheral wall between said first and second bearing means to prevent passage of foreign particles therebetween.

2. A lubrication system for a machine having a frame, first bearing means in said frame and having a first axis, a rotatable carrier journalled in said first bearing means for rotation about said axis, a bore in said carrier having a second axis parallel to but not coincident with said first axis, said bore having first and second contiguous portions, said first portion being defined by a first peripheral surface, second bearing means in said second portion, a rotatable spindle journalled in said second bearing means for rotation on said second axis, said spindle having a second peripheral surface substantially axially coextensive with said first peripheral surface, generally spiral grooves on one of said first and second peripheral surfaces extending from a first to a second end thereof, said second end lying adjacent said second bearing means, and conduit means cooperating with the first ends of said grooves to introduce lubricant thereto, relative rotation of said first and second peripheral surfaces forcing lubricant through said grooves from said first to said second ends thereof to lubricate said second bearing means, said carrier providing a continuous unbroken peripheral wall between said first and second bearing means to prevent passage of foreign particles therebetween.

3. A lubrication system for a machine having a frame, first bearing means in said frame, a movable carrier journalled in said first bearing means on a first axis, a bore in said carrier, said bore having first and second contiguous portions, said first portion being a first peripheral surface, second bearing means in said second portion, a rotatable spindle journalled in said second bearing means on an axis non-coincident with said first axis, said spindle having a second peripheral surface substantially axially coextensive with said first peripheral surface, generally spiral grooves and lands on one of said first and second peripheral surfaces extending the length thereof and terminating adjacent said second bearing means, said lands having a radial clearance relative to the other of said first and second peripheral surfaces in the range of .015 of an inch to .105 of an inch, and conduit means cooperating with said grooves to introduce lubricant thereto, said carrier providing a continuous unbroken outer peripheral wall between said first and second bearing means to prevent passage of foreign particles therebetween.

4. A lubrication system for a machine having a frame, first bearing means in said frame and having a first axis, a rotatable carrier journalled in said first bearing means for rotation about said axis, a bore in said carrier having a second axis parallel to but not coincident with said first axis, said bore having first and second contiguous portions, said first portion being defined by a first cylindrical surface, second bearing means in said second portion, a rotatable spindle journalled in said second bearing means for rotation on said second axis, said spindle having a second cylindrical surface substantially axially coextensive with said first cylindrical surface, generally spiral grooves and lands on one of said first and second cylindrical surfaces extending from a first to a second end thereof, said second end lying adjacent said second bearing means, said lands having a radial clearance relative to the other of said first and second cylindrical surfaces in the range of .015 of an inch to .105 of an inch, and conduit means cooperating with the first ends of said grooves to introduce lubricant thereto, relative rotation of said first and second cylindrical surfaces forcing lubricant through said grooves from said first to said second ends thereof to lubricate said second bearing means, said carrier providing a continuous unbroken peripheral wall between said first and second bearing means to prevent passage of foreign particles therebetween.

5. A lubrication system for a machine tool having a frame, first bearing means in said frame and having a first axis, a rotatable carrier journalled in said first bearing means for rotation about said axis, first and second bores in said carrier having axes parallel to but not coincident with said first axis, said bores each having first and second contiguous portions, said first portions being defined by first peripheral surface means, second bearing means in said second portions, first and second rotatable spindles journalled in the second bearing means for rotation on said parallel axes, each of said spindles having second peripheral surface means substantially axially coextensive with said first peripheral surface means, respectively, generally spiral grooves and lands on one of said first and second peripheral surface means extending from a first to a second end thereof, said second ends lying adjacent said second bearing means, said lands having a radial clearance relative to the other of said first and second peripheral surface means in the range of .015 of an inch to .105 of an inch, and conduit means cooperating with each spindle in sequence as said carrier is rotated to introduce lubricant to the first ends of said grooves, relative rotation of said first and second peripheral surface means forcing lubricant through said grooves from said first to said second ends thereof to lubricate said second bearing means, said carrier providing a continuous unbroken peripheral wall between said first and second bearing means to prevent passage of foreign particles therebetween.

6. A lubrication system for an automatic machine tool having a frame, first bearing means in said frame, a spindle carrier journalled in said first bearing means on a first axis, second bearing means in said spindle carrier, at least one rotatable spindle journalled in said second bearing means on a second axis non-coincident with said first axis, curved lubricant grooves on the outer periphery of said spindle and communicating with said second bearing means, and means cooperating with said lubricant grooves to introduce lubricant thereto at a first but not at a second rotational position of said spindle carrier.

7. A lubrication system for an automatic machine tool having a frame, first bearing means in said frame, a spindle carrier journalled in said first bearing means on a first axis, second bearing means in said spindle carrier, at least one rotatable spindle journalled in said second bearing means on an axis non-coincident with said first axis, a lubricant sleeve rotatable with said rotatable spindle, and disposed inside said spindle carrier, said lubricant sleeve having first and second ends with said second end communicating with said second bearing means, curved lubricant grooves on the outer periphery of said sleeve, and means cooperating with the first ends of said sleeve to introduce lubricant only intermittently to said sleeve groove.

8. A lubrication system for a multiple spindle automatic machine tool having a frame, first bearing means in said frame, a spindle carrier journalled in said first bearing means on a first axis, a given plurality of bores in said spindle carrier, second bearing means in said bores, rotatable spindles each journalled in the second bearing means in a different one of said bores on axes non-coincident with said first axis, lubricant sleeves rotatable with each of said rotatable spindles and disposed in said bores, said sleeves having first and second ends with said second ends communicating with said second bearing means, curved lubricant grooves on the outer periphery of said sleeves, means cooperating with the first ends of said sleeves to introduce lubricant to each of said sleeve grooves in turn as the spindle carrier is indexed, said spindle carrier providing a continuous unbroken outer peripheral wall between said first and second bearing means to prevent passage of foreign particles therebetween.

9. A lubrication system for a multiple spindle automatic machine tool having a frame, said frame having a first bearing therein, a spindle carrier journalled in said first bearing on a first axis, said spindle carrier having a given plurality of bores, bearing means being carried in each of said bores, a rotatable spindle journalled in the bearing means in each bore on an axis non-coincident with said first axis, a lubricant sleeve rotatable with each of said rotatable spindles and disposed in said bores, said sleeves having first and second ends with said second ends communicating with said bearing means, and with said first ends axially extending out of the respective bores, lubricant grooves on the outer periphery of said sleeves extending generally the length of said sleeves and at least partially around said sleeves, means cooperating with the first ends of said sleeves to introduce lubricant to said sleeve grooves in turn as the spindle carrier is indexed.

10. A lubrication system for a multiple spindle automatic machine tool having a frame, said frame having a first bearing therein, a spindle carrier journalled in said first bearing on a first axis, said spindle carrier having a given plurality of bores, bearing means being carried in each of said bores, a rotatable spindle journalled in the bearing means in each bore on axes non-coincident with said first axis, a lubricant sleeve rotatable with each of said rotatable spindles and disposed in said bores, said sleeves having first and second ends with said second ends substantially adjacent said bearing means, lubricant grooves on the outer periphery of said sleeves extending generally the length of said sleeves and at least partially around said sleeves, conduit means cooperating with the first ends of said sleeves to introduce lubricant to said sleeve grooves in turn as the spindle carrier is indexed, said spindle carrier providing a continuous unbroken outer peripheral wall between said first bearing and said bearing means to prevent passage of foreign particles therebetween.

11. A lubrication system for a multiple spindle automatic machine tool having a frame, said frame having first and second portions with first and second coaxial and spaced bearings therein, respectively, a spindle carrier having third and fourth portions with third and fourth bearings, respectively, said third and fourth bearings being journalled in said first and second bearings, respectively, on a first axis, said spindle carrier having first and second sets of concentric bores in said third and fourth portions, respectively, each bore having bearing means with said sets of bores journalling a given plurality of rotatable spindles on axes non-coincident with said first axis, lubricant sleeves rotatable with each of said rotatable spindles and disposed in said first and second concentric bores, said sleeves having first and second ends with said second ends substantially adjacent said bearing means, lubricant grooves on the outer periphery of said sleeves extending generally the length of said sleeves and at least partially around said sleeves, conduit means cooperating with the first ends of said sleeves to introduce lubricant to said sleeve grooves in turn as the spindle carrier is indexed.

12. A lubrication system for a multiple spindle automatic machine tool having a frame, said frame having a first sleeve bearing therein, a spindle carrier journalled in said first sleeve bearing on a first axis, said spindle carrier having a given plurality of bores, two roller bearings being carried in each of said bores, a rotatable spindle journalled in the two roller bearings in each bore on an axis non-coincident with said first axis, an oil sleeve rotatable with each of said rotatable spindles and disposed in said bores, said oil sleeves having first and second ends with said second ends substantially adjacent a roller bearing and with said first ends axially extending out of the respective bores, spiral grooves and lands on the outer periphery of said oil sleeves extending from said first to said second end thereof, said lands having a radial clearance relative to said concentric bores in the range of .015 of an inch to .105 of an inch, conduit means disposed above said spindle carrier and cooperating with the first ends of said oil sleeves to introduce oil to the grooves of each of said oil sleeves in turn as the spindle carrier is indexed, said spindle carrier providing a continuous unbroken outer peripheral wall between said sleeve bearing and said roller bearings to prevent passage of foreign particles therebetween.

13. A lubrication system for a multiple spindle automatic machine tool having a frame, said frame having first and second portions with first and second coaxial and spaced sleeve bearings on a first axis therein, respectively, a spindle carrier having third and fourth portions with third and fourth sleeve bearings, respectively, said third and fourth sleeve bearings being journalled in said first and second sleeve bearings, respectively, said spindle carrier having first and second concentric bores in said third and fourth portions, respectively, for each of a given plurality of rotatable spindles each journalled on an axis non-coincident with said first axis in four tapered roller bearings carried in said spindle carrier, two of said roller bearings being carried in said first concentric bore in said third portion and the other two of said roller bearings being carried in said second concentric bore in said fourth portion, first and second oil sleeves rotatable with each of said rotatable spindles and disposed in said first and second concentric bores, respectively, said oil sleeves having first and second ends with said second ends substantially adjacent a roller bearing and with said first ends axially extending out of the respective bores, spiral grooves and lands on the outer periphery of said oil sleeves extending from said first to said second end thereof, said lands having a radial clearance relative to said concentric bores in the range of .015 of an inch to .105 of an inch, first and second conduit means disposed above said spindle carrier and adjacent said third and fourth portions, respectively, and cooperating with the first ends of said first and second oil sleeves, respectively, to introduce oil to each of said oil sleeve grooves in turn as the spindle carrier is indexed.

14. A lubrication system for a multiple spindle automatic machine tool having a frame, said frame having first and second portions with first and second coaxial and spaced sleeve bearings on a first axis therein, respectively, a spindle carrier having third and fourth portions with third and fourth sleeve bearings, respectively, said third and fourth sleeve bearings being journalled in said first and second sleeve bearings, respectively, said spindle carrier having first and second concentric bores in said third and fourth portions, respectively, for each of a given plurality of rotatable spindles, each of said rotatable spindles being on an axis non-coincident with said first axis and having a rotatable sleeve journalled in four tapered roller bearings carried in said spindle carrier, two of said roller bearings being carried in said first concentric bore in said third portion and the other two of said roller bearings being carried in said second concentric bore in said fourth portion, first and second oil sleeves fixed to and rotatable with each of said rotatable spindle sleeves and disposed in said first and second concentric bores, respectively, said oil sleeves having first and second ends with said second ends substantially adjacent a roller bearing and with said first ends axially extending out of the respective bores, spiral grooves and lands on the outer periphery of said oil sleeves extending from said first to said second end thereof, said lands having a radial clearance relative to said concentric bores in the range of .015 of an inch to .105 of an inch, first and second conduit means disposed above said spindle carrier and adjacent said third and fourth portions, respectively, and cooperating with the first ends of said first and second oil sleeves, respectively, to introduce oil to the grooves of each of said oil sleeves sequentially as the spindle carrier is indexed, said spindle carrier providing a continuous unbroken outer peripheral wall between said sleeve bearings and said roller bearings to prevent passage of foreign particles therebetween.

References Cited in the file of this patent

UNITED STATES PATENTS 1,934,278    Raule                Nov. 7, 1933